United States Patent
Norling et al.

(10) Patent No.: US 9,103,258 B2
(45) Date of Patent: Aug. 11, 2015

(54) ARRANGEMENT FOR INTRODUCING A LIQUID MEDIUM INTO EXHAUST COMBUSTION ENGINE

(75) Inventors: Daniel Norling, Huddinge (SE); Daniel Ryrfeldt, Hägersten (SE); Markus Mustonen, Nyköping (SE); Henrik Birgersson, Stockholm (SE); Emelie Lagerkvist, Stockholm (SE); Fatima Strand, Hägersten (SE); Per Birkestad, Stockholm (SE); Magnus Wahlberg, Stockholm (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/346,978

(22) PCT Filed: Sep. 12, 2012

(86) PCT No.: PCT/SE2012/050957
§ 371 (c)(1),
(2), (4) Date: Jun. 11, 2014

(87) PCT Pub. No.: WO2013/048309
PCT Pub. Date: Apr. 4, 2013

(65) Prior Publication Data
US 2014/0311133 A1    Oct. 23, 2014

(30) Foreign Application Priority Data

Sep. 26, 2011 (SE) ...................................... 1150875

(51) Int. Cl.
*F01N 3/00* (2006.01)
*F01N 3/10* (2006.01)
(Continued)

(52) U.S. Cl.
CPC .............. *F01N 3/20* (2013.01); *B01F 3/04021* (2013.01); *B01F 5/0659* (2013.01);
(Continued)

(58) Field of Classification Search
CPC ............ F01N 2610/10; F01N 2610/08; F01N 2610/02; F01N 2610/1453; F01N 3/20; F01N 3/2066; F01N 5/02; F01N 2470/18; Y02T 10/24
USPC .................... 60/286, 295, 296, 301, 303, 324
See application file for complete search history.

(56) References Cited

U.S. PATENT DOCUMENTS 2,946,651 A * 7/1960 Houdry .......................... 423/212
5,685,143 A * 11/1997 Aitta et al. ........................ 60/297
(Continued)

FOREIGN PATENT DOCUMENTS

FR          2 925 583         6/2009
WO    WO 2007/110575 A1    10/2007

OTHER PUBLICATIONS

International Search Report mailed Dec. 20, 2012 in corresponding PCT International Application No. PCT/SE2012/050957.

*Primary Examiner* — Thomas Denion
*Assistant Examiner* — Diem Tran
(74) *Attorney, Agent, or Firm* — Ostrolenk Faber LLP

(57) ABSTRACT

An arrangement for introducing a liquid medium into exhaust gases from a combustion engine: A mixing chamber (3) has exhaust gases flow through it. Its downstream end (5) has an endwall (7) of thermally conductive material as an end surface of the mixing chamber (3). An injector injects the liquid medium spray into the mixing chamber (3) or into exhaust gases led into the mixing chamber (3). An exhaust passage (13) adjacent to the mixing chamber (3) is intended for exhaust gases to flow through it and is delineated from the mixing chamber (3) by the endwall (7). Heat flanges (14) of thermally conductive material are situated on at least part of the side of said endwall (7) which faces towards the exhaust passage (13), extend into the exhaust passage (13), absorb heat from exhaust gases which flow through the exhaust passage and give off this heat to the endwall.

10 Claims, 4 Drawing Sheets

(51) Int. Cl.
  *F01N 1/00*       (2006.01)
  *F01N 3/20*       (2006.01)
  *B01F 5/06*       (2006.01)
  *B01F 15/06*      (2006.01)
  *B01F 3/04*       (2006.01)
  *F01N 5/02*       (2006.01)

(52) U.S. Cl.
  CPC ........... *B01F 15/066* (2013.01); *F01N 3/2066* (2013.01); *F01N 5/02* (2013.01); *B01F 2015/062* (2013.01); *F01N 2470/18* (2013.01); *F01N 2610/02* (2013.01); *F01N 2610/08* (2013.01); *F01N 2610/10* (2013.01); *F01N 2610/1453* (2013.01); *Y02T 10/16* (2013.01); *Y02T 10/24* (2013.01)

(56) References Cited

U.S. PATENT DOCUMENTS

| | | | |
|---|---|---|---|
| 6,679,052 B2 * | 1/2004 | Nakatani et al. | 60/297 |
| 7,900,443 B2 * | 3/2011 | Stieglbauer | 60/297 |
| 2006/0008397 A1 | 1/2006 | Bruck | 422/180 |
| 2010/0139258 A1 * | 6/2010 | Hackett et al. | 60/299 |
| 2010/0199645 A1 | 8/2010 | Telford | 60/295 |
| 2011/0083428 A1 | 4/2011 | Makartchouk | 60/295 |

* cited by examiner

ARRANGEMENT FOR INTRODUCING A LIQUID MEDIUM INTO EXHAUST COMBUSTION ENGINE

CROSS-REFERENCE TO RELATED APPLICATIONS

The present application is a 35 U.S.C. §§371 national phase conversion of PCT/SE2012/050957, filed Sep. 12, 2012, which claims priority of Swedish Application No. 1150875-1, filed Sep. 26, 2011, the contents of which are incorporated by reference herein. The PCT International Application was published in the English language.

FIELD OF THE INVENTION, AND PRIOR ART

The present invention relates to an arrangement for introducing a liquid medium, e.g. urea, into exhaust gases from a combustion engine.

To meet prevailing exhaust cleaning requirements, today's motor vehicles are usually provided with a catalyst in the exhaust line to effect catalytic conversion of environmentally hazardous constituents of the exhaust gases to environmentally less hazardous substances. A method which has been employed for achieving effective catalytic conversion is based on injecting a reducing agent into the exhaust gases upstream of the catalyst. A reductive substance which forms part of, or is formed by, the reducing agent is carried by the exhaust gases into the catalyst and is adsorbed on active seats in the catalyst, resulting in accumulation of the reductive substance in the catalyst. The accumulated reductive substance may then react with and thereby convert an exhaust substance to a substance with less environmental impact. Such a reduction catalyst may for example be of SCR (selective catalytic reduction) type. This type of catalyst is hereinafter called SCR catalyst. An SCR catalyst reduces $NO_x$ in the exhaust gases. In the case of an SCR catalyst, a reducing agent in the form of urea is usually injected into the exhaust gases upstream of the catalyst. The injection of urea into the exhaust gases results in the formation of ammonia which then serves as the reductive substance which assists the catalytic conversion in the SCR catalyst. The ammonia accumulates in the catalyst by being adsorbed on active seats in the catalyst, and $NO_x$ present in the exhaust gases is converted to nitrogen gas and water when it is brought into contact in the catalyst with accumulated ammonia on the active seats in the catalyst.

When urea is used as reducing agent, it is injected into the exhaust line in the form of a liquid urea solution via an injection means. The injection means comprises a nozzle via which the urea solution is injected under pressure into the injection means in the form of a finely divided spray. In many operating states of a diesel engine the exhaust gases will be at a high enough temperature to be able to vaporise the urea solution so that ammonia is formed. It is difficult, however, to avoid part of the urea solution supplied coming into contact with and becoming attached to the internal wall surface of the exhaust line in an unvaporised state. When a combustion engine is run in a uniform way for a period of time, i.e. during steady-state operating conditions, no appreciable variations in the exhaust flow occur and the urea solution injected into the exhaust gases will therefore encounter substantially the same region of the exhaust line throughout said period of time. The relatively cool urea solution may cause local lowering of the temperature in that region of the exhaust line to below 100° C., which may lead to the formation in that region of a film of urea solution which is then entrained by the exhaust flow. When this film has moved a certain distance in the exhaust line, the water in the urea solution will boil away under the influence of the hot exhaust gases. Solid urea will remain and be slowly vaporised by the heat in the exhaust line. If the supply of solid urea is greater than the vaporisation, solid urea will accumulate in the exhaust line. If the resulting layer of urea becomes thick enough, the urea and its decomposition products will react with one another to form urea-based primitive polymers known as urea lumps. Such urea lumps may over time block an exhaust line.

An arrangement according to the prior art is already known from WO 2007/110575 A1.

OBJECT OF THE INVENTION

The object of the present invention is to propose an arrangement of the type indicated above which affords better potential for ensuring good vaporisation of reducing agent injected.

SUMMARY OF THE INVENTION

The arrangement according to the invention comprises
a mixing chamber which is intended to have exhaust gases flow through it and which has at its downstream end an endwall of thermally conductive material which serves as an end surface of the mixing chamber,
an injector means for injecting the liquid medium in spray form into the mixing chamber or into exhaust gases which are led into the mixing chamber,
an exhaust passage which is adjacent to the mixing chamber, is intended to have exhaust gases flow through it and is delineated from the mixing chamber by said endwall, and
heat flanges of thermally conductive material situated on at least part of said endwall on the side of the endwall which faces towards said exhaust passage, which flanges extend into the exhaust passage and are adapted to absorbing heat from exhaust gases which flow through the exhaust passage and to giving off this heat to the endwall.

The exhaust gases which flow through the exhaust passage will give off heat to the endwall, the inside of which serves as an internal wall surface of the mixing chamber. This has a result of counteracting a cooling of this internal wall surface of the mixing chamber and consequently tending to prevent injected medium from becoming attached to this internal wall surface without being vaporised. The heat flanges extending from the endwall into the exhaust passage provide assurance of effective transfer of heat to the endwall from the exhaust gases which pass through the exhaust passage.

An embodiment of the invention is characterised
in that said exhaust passage is connected to a tubular duct portion of an exhaust duct which is adapted to leading exhaust gases to the exhaust passage, which duct portion is delineated in inward radial directions by a tubular inner wall which is connected to said endwall, and
that at least some of said heat flanges are provided with flange portions which extend into said tubular duct portion. Providing the heat flanges with flange portions which extend into the tubular duct portion makes it possible for the heat flanges to have a relatively large heat-absorbing surface.

According to another embodiment of the invention, said flange portions are situated at distances from said tubular inner wall. The flange portions extending into the tubular duct portion are thus prevented from giving off heat to the tubular inner wall of this duct portion, so that the heat absorbed by these flange portions can instead be led on to the mixing chamber's endwall for effective transfer of heat to the latter.

Other advantageous features of the arrangement according to the invention are indicated by the independent claims and the description set out below.

BRIEF DESCRIPTION OF THE DRAWINGS

The invention is described below in more detail on the basis of embodiment examples with reference to the attached drawings, in which.

DETAILED DESCRIPTION OF EMBODIMENTS OF THE INVENTION

Figure 1:
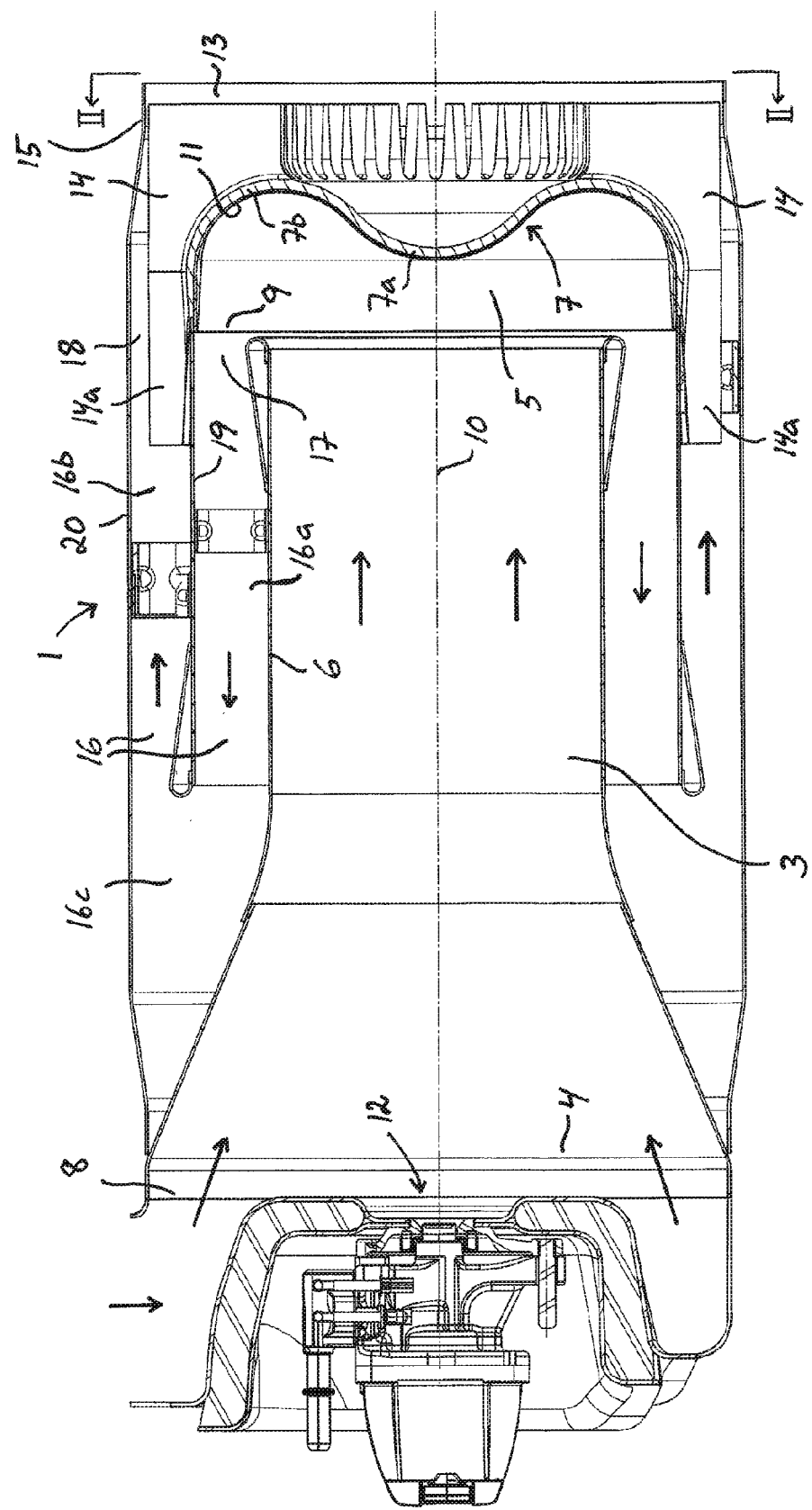
FIG. 1 is a schematic longitudinal section through an arrangement according to a first embodiment of the present invention.

FIGS. 1-6 illustrate an arrangement 1 according to two different embodiments of the present invention for introducing a liquid medium into exhaust gases from a combustion engine. The arrangement may for example be situated in an exhaust line upstream of an SCR catalyst in order to introduce a liquid reducing agent in the form of urea or ammonia into the exhaust line upstream of the SCR catalyst, or be situated in an exhaust post-treatment device in order to introduce a liquid reducing agent in the form of urea or ammonia upstream of an SCR catalyst which forms part of the exhaust post-treatment device.

The arrangement 1 comprises a mixing chamber 3 intended to receive exhaust gases from a combustion engine and lead them towards an exhaust post-treatment unit, e.g. in the form of an SCR catalyst. The mixing chamber 3 is thus intended to have exhaust gases flow through it. The mixing chamber has an upstream end 4 and a downstream end 5. The mixing chamber is delineated in the axial direction by an endwall 7 at its downstream end 5. The mixing chamber is further delineated in radial directions by a tubular wall 6 which extends between the injection chamber's upstream end 4 and downstream end 5. The mixing chamber has an inlet 8 to receive exhaust gases at its upstream end and an outlet 9 to release exhaust gases at its downstream end. The outlet 9 is situated at the end of the tubular wall 6 between this tubular wall 6 and the periphery of the endwall 7. The outlet 9 is with advantage annular and adapted to extending round the mixing chamber's centreline 10. The inlet 8 is likewise with advantage annular and adapted to extending round the mixing chamber's centreline 10.

Figure 4:
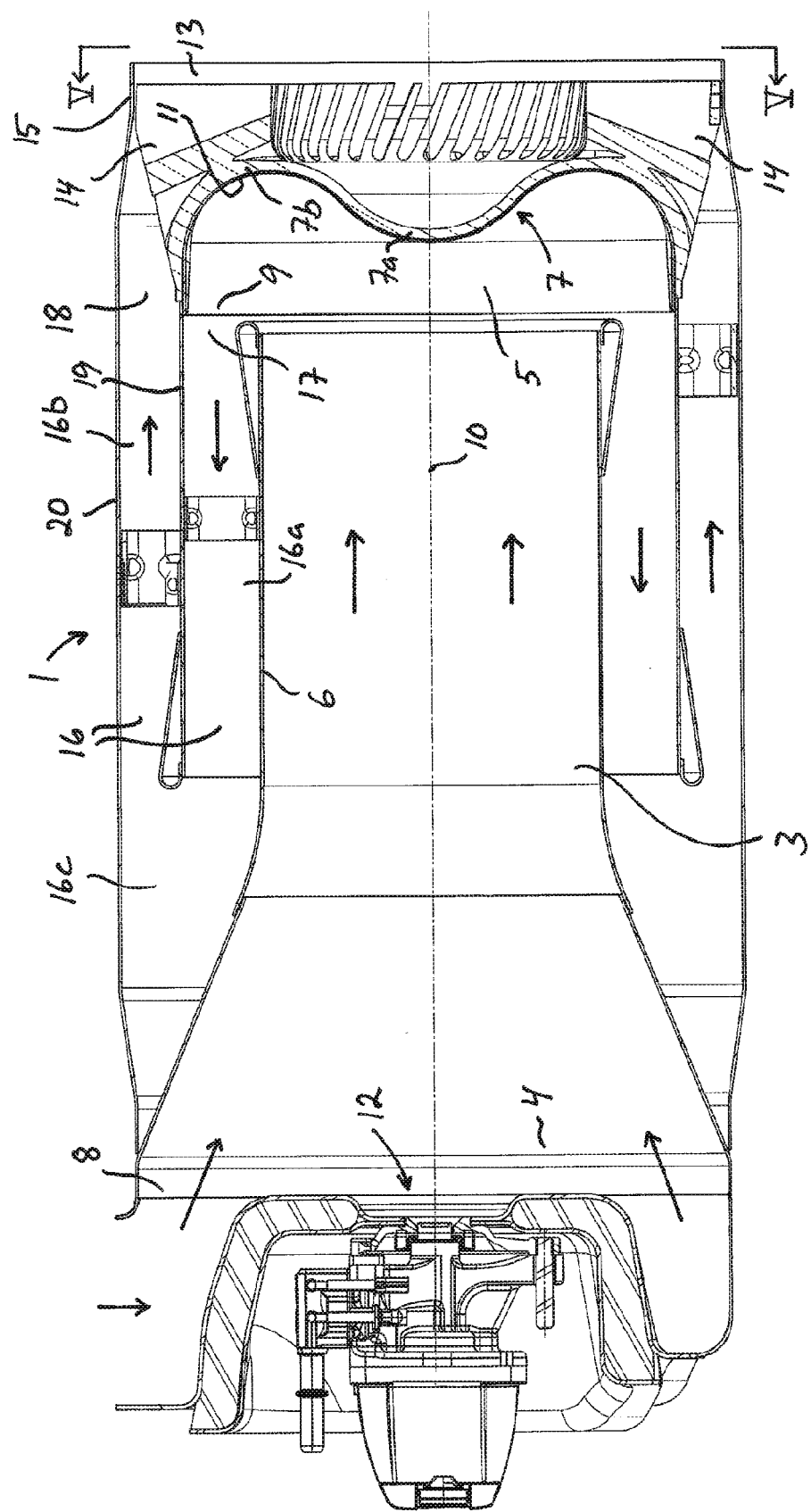
FIG. 4 is a schematic longitudinal section through an arrangement according to a second embodiment of the present invention.
Figure 5:
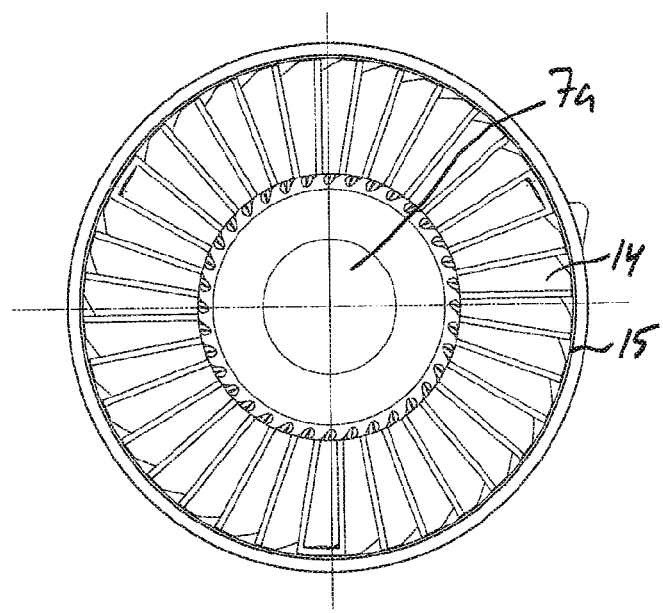
FIG. 5 is a view along the line V-V in FIG. 4.
Figure 6:
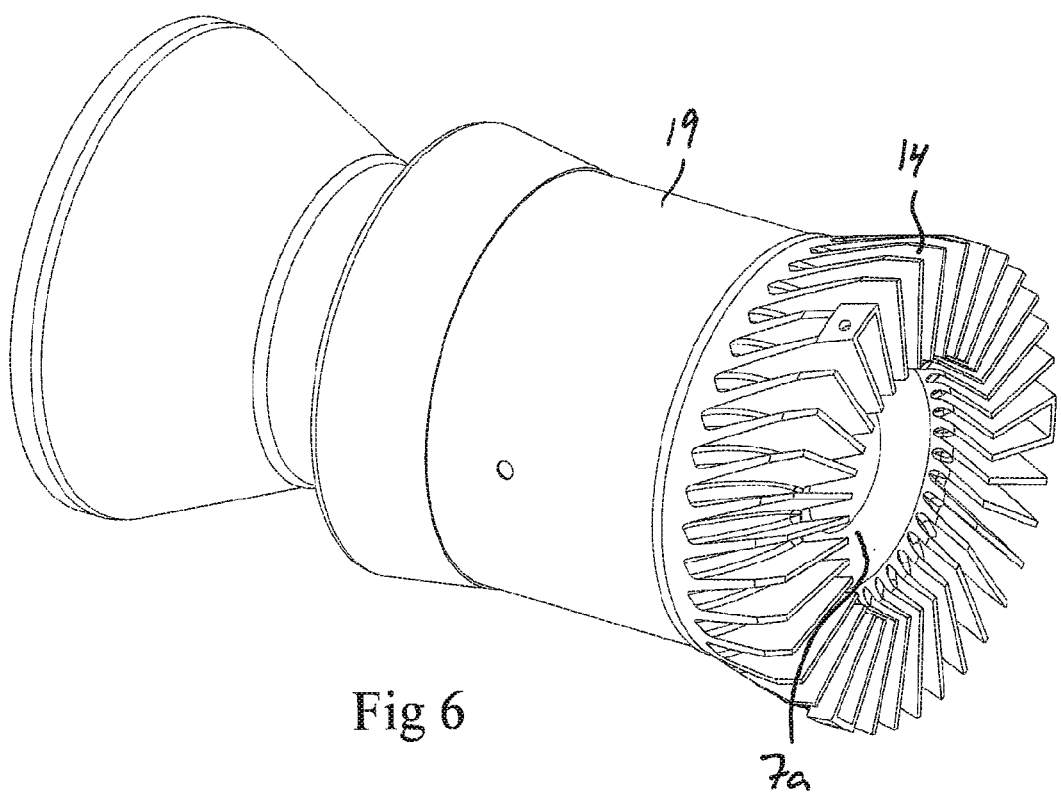
FIG. 6 is a perspective view of constituent parts of the arrangement according to FIG. 4.

In the embodiments depicted, the endwall 7 is provided with a middle portion 7a and an annular edge portion 7b which surrounds the middle portion. The side of the middle portion 7a which faces towards the mixing chamber 3 is with advantage of convex shape as illustrated in FIGS. 1 and 4. The side of the endwall's edge portion 7b which faces towards the mixing chamber 3 serves as a guide surface 11 which is rounded to guide the exhaust gases flowing towards the endwall 7 to flow towards the mixing chamber's outlet 9 by reversal of their direction of flow.

An injection means 12 for injecting the liquid medium is situated at the centre of the mixing chamber's upstream end 4 to inject the liquid medium towards the mixing chamber's downstream end 5. The injection means 12, which may for example comprise an injection nozzle, is adapted to injecting the liquid medium into the mixing chamber 3 in finely divided spray form under pressure.

The arrangement 1 further comprises a exhaust passage 13 situated adjacent to and downstream of the mixing chamber 3. This exhaust passage is intended to have exhaust gases flow through it and is delineated from the mixing chamber by the aforesaid endwall 7. Heat flanges 14 of thermally conductive material are provided on at least part of the side of the endwall 7 which faces towards said exhaust passage 13. These heat flanges are in heat-transferring contact with the endwall 7. They extend into the exhaust passage 13 and are adapted to absorbing heat from exhaust gases which flow through the exhaust passage and to giving off this heat to the endwall 7 to warm its surfaces which face in towards the mixing chamber. The endwall 7 and the heat flanges 14 are with advantage made of metal material with good thermal conductivity. In the embodiments depicted, the heat flanges abut against the endwall's annular edge portion 7b, whereas the middle portion 7a is free from heat flanges. The flanges are distributed in the circumferential direction of the endwall's annular edge portion 7b. In the embodiment depicted in FIGS. 1-3, they extend in the endwall's radial direction. The exhaust passage 13 is surrounded by a tubular wall 15 and the heat flanges 14 are spaced from this tubular wall 15 to avoid conducting heat to it.

In the embodiments depicted, the mixing chamber 3 is connected to the exhaust passage 13 via an exhaust duct 16 which has an annular inlet 17 to receive exhaust gases from the mixing chamber, and an outlet 18 leading to the exhaust passage's upper end to deliver exhaust gases to the exhaust passage. The exhaust duct outlet 18 is annular and extends round the endwall's edge portion 7b. The exhaust duct comprises a first duct portion 16a which is annular in cross-section and which has the exhaust duct inlet 17 situated at its upstream end. The exhaust duct comprises also a second duct portion 16b which is annular in cross-section and situated downstream of the first duct portion 16a. The exhaust duct outlet 18 is situated at the downstream end of this second duct portion 16b. The first duct portion 16a surrounds and is concentric with the mixing chamber. The second duct portion 16b surrounds and is concentric with the first duct portion 16a. The second duct portion 16b is connected to the first duct portion 16a via a flow reversal portion 16c which is part of the exhaust duct and which is adapted to reversing the direction of flow of the exhaust gases flowing through the exhaust duct so that they are caused to flow through the second duct portion 16b in a direction opposite to that of their flow in the first duct portion 16a. In the first duct portion 16a the exhaust gases flow in a direction opposite to that of their flow in the mixing chamber.

The mixing chamber is delineated from the exhaust duct's first duct portion 16a by the aforesaid tubular wall 6. The first duct portion 16a of the exhaust duct extends on the outside of this tubular wall. The first and second duct portions 16a, 16b of the exhaust duct are themselves delineated from one another by a tubular separating wall 19 which is situated externally to said wall 6 and serves as an inner wall of the second duct portion 16b. The second duct portion 16b is delineated in radial directions by a tubular wall 20 situated externally about the separating wall 19 and serving as an outer wall of the second duct portion 16b. The separating wall 19 is connected to the endwall's edge portion 7b, whereas the tubular wall 20 is connected to the aforesaid tubular wall 15 of the exhaust passage 13.

The spray of liquid medium injected into the mixing chamber 3 via the injection means 12 comes into contact in the mixing chamber with exhaust gases which flow into the chamber via its inlet 8 in a substantially symmetrically flow round this spray. The exhaust gases flowing into the mixing chamber carry the liquid medium with them downstream in the mixing chamber. During its movement downstream in the mixing chamber, the liquid medium spreads out into the exhaust gases and part of it is vaporised by their heat. Liquid medium which does not vaporise while moving through the mixing chamber reaches the endwall 7 at the chamber's downstream end 5. The liquid medium which reaches this endwall 7 will be vaporised by the hot exhaust gases. From the mixing chamber the exhaust gases proceed via the exhaust duct 16 to the exhaust passage 13. When entering the exhaust passage, they flow along and give off heat to the heat flanges 14. The flanges pass this heat on to the endwall 7.

Figure 2:
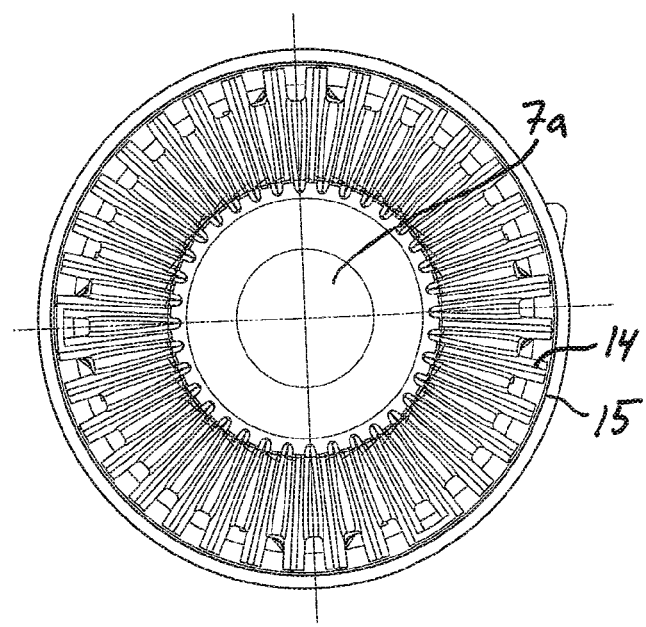
FIG. 2 is a view along the line II-II in FIG. 1.
Figure 3:
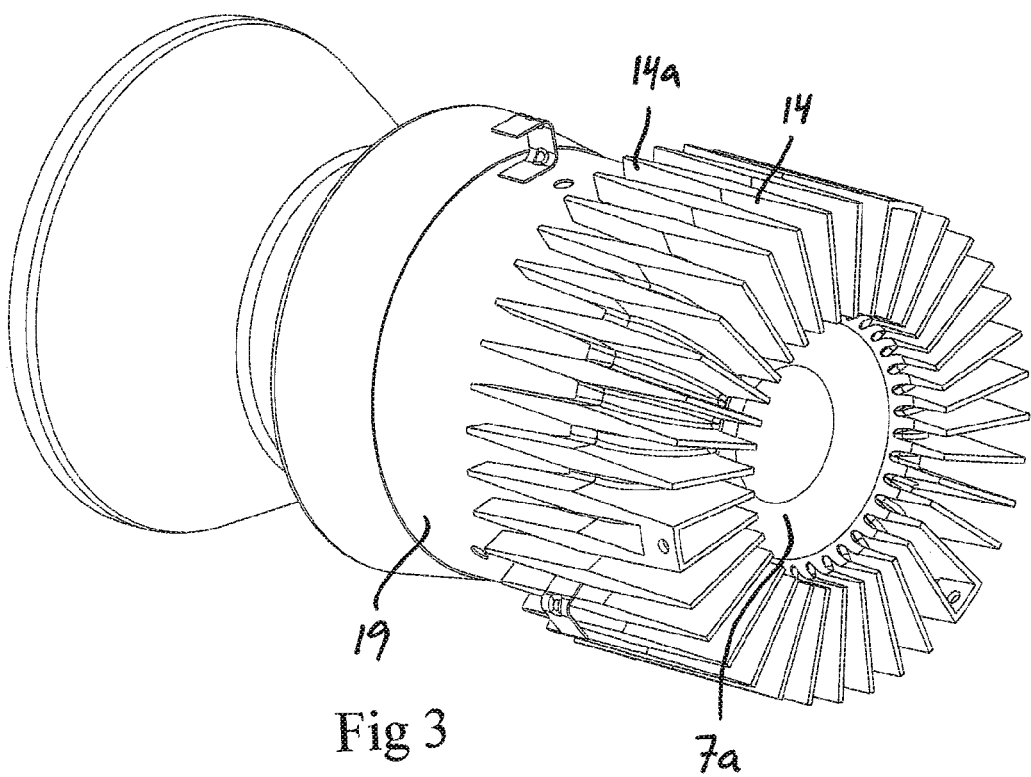
FIG. 3 is a perspective view of constituent parts of the arrangement according to FIG. 1.

In the embodiment depicted in FIGS. 1-3, the heat flanges are provided with flange portions 14a which extend into the aforesaid second duct portion 16b of the exhaust duct. These flange portions extend in the longitudinal direction of the second duct portion 16b. They are situated between the tubular inner wall 19 and the tubular outer wall 20 of the second duct portion 16b and are spaced from both the inner wall 19 and the outer wall 20 to avoid conducting heat to them. The heat flanges 14 are thus not in heat-transferring contact with the tubular walls 19, 20 of the second duct portion 16b, but only with the endwall 7.

The arrangement according to the invention is particularly intended for use in a heavy motor vehicle, e.g. a bus, a tractor vehicle or a truck.

The invention is of course in no way restricted to the embodiments described above, since many possibilities for modifications thereof are likely to be obvious to one skilled in the art without having to deviate from the invention's basic concept such as defined in the attached claims.

The invention claimed is:

1. An arrangement for introducing a liquid medium into exhaust gases from a combustion engine, the arrangement comprising:
    a mixing chamber configured for flow of exhaust gases through the mixing chamber, the mixing chamber has a downstream end, an endwall of thermally conductive material located at the downstream end and defining an end surface of the mixing chamber;
    an injector configured for injecting the liquid medium in spray form into the mixing chamber or into exhaust gases which are led into the mixing chamber;
    an exhaust passage adjacent to the mixing chamber, the exhaust passage is configured to have exhaust gases flow through it and is delineated from the mixing chamber by the endwall;
    heat flanges of thermally conductive material situated on at least part of a side of the endwall which faces towards the exhaust passage and extending into the exhaust passage; the heat flanges are configured to absorb heat from exhaust gases which flow through the exhaust passage and to give off this heat to the endwall;
    an exhaust duct having a tubular duct portion to which the exhaust passage is connected, and the exhaust duct is configured to lead exhaust gases to the exhaust passage, the duct portion is delineated in radial directions inwards by a tubular inner wall which is connected to the endwall; and
    at least some of the heat flanges have flange portions which extend into the tubular duct portion.

2. An arrangement according to claim 1, wherein the heat flanges are situated on an annular portion of the endwall and are distributed in the circumferential direction of the annular portion.

3. An arrangement according to claim 1, wherein the exhaust passage is situated downstream of the mixing chamber.

4. An arrangement according to claim 1, wherein the injector is situated at the center of the mixing chamber at an upstream end of the chamber and the injector is configured to inject the liquid medium towards the mixing chamber's downstream end.

5. An arrangement according to claim 1, wherein the end wall and the heat flanges are made of metal.

6. An arrangement according to claim 1, wherein the liquid medium is urea.

7. An arrangement according to claim 1, further comprising:
    a tubular wall surrounding the exhaust passage; and
    the heat flanges are situated at a distance from the tubular wall.

8. An arrangement according to claim 7, wherein the flange portions are situated at a distance from the tubular inner wall.

9. An arrangement according to claim 8, wherein the tubular duct portion is delineated in radial directions outwards by a tubular outer wall which is situated externally about the tubular inner wall; and
    the flange portions are situated between the tubular inner wall and the tubular outer wall and at a distance from the tubular outer wall.

10. An arrangement according to claim 9, wherein the tubular outer wall of the tubular duct portion is connected to the tubular wall of the exhaust passage.

* * * * *